(12) United States Patent
Shin et al.

(10) Patent No.: US 12,315,964 B2
(45) Date of Patent: May 27, 2025

(54) BATTERY MODULE AND BATTERY PACK INCLUDING THE SAME

(71) Applicant: LG ENERGY SOLUTION, LTD., Seoul (KR)

(72) Inventors: Jinhwan Shin, Daejeon (KR); Kye Yeon Ryu, Daejeon (KR); Hyoungsuk Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 504 days.

(21) Appl. No.: 17/771,693

(22) PCT Filed: Jul. 20, 2020

(86) PCT No.: PCT/KR2020/009539
§ 371 (c)(1),
(2) Date: Apr. 25, 2022

(87) PCT Pub. No.: WO2021/107318
PCT Pub. Date: Jun. 3, 2021

(65) Prior Publication Data
US 2022/0407197 A1 Dec. 22, 2022

(30) Foreign Application Priority Data
Nov. 26, 2019 (KR) .................. 10-2019-0153520

(51) Int. Cl.
*H01M 50/581* (2021.01)
*H01M 50/211* (2021.01)
(Continued)

(52) U.S. Cl.
CPC ....... *H01M 50/581* (2021.01); *H01M 50/211* (2021.01); *H01M 50/503* (2021.01);
(Continued)

(58) Field of Classification Search
CPC .......... H01M 2200/10; H01M 50/211; H01M 50/503; H01M 50/507; H01M 50/572;
(Continued)

(56) References Cited

U.S. PATENT DOCUMENTS 11,046,206 B2  6/2021  Hong et al.
2010/0136415 A1  6/2010  Aha et al.
(Continued)

FOREIGN PATENT DOCUMENTS

EP  3 404 742 A1  11/2018
JP  2008-130458 A  6/2008
(Continued)

OTHER PUBLICATIONS

US 11,007,898 B2, 05/2021, Hong et al. (withdrawn)
(Continued)

*Primary Examiner* — Victoria H Lynch
(74) *Attorney, Agent, or Firm* — Birch, Stewart, Kolasch & Birch, LLP

(57) ABSTRACT

The battery module includes: a battery cell stack in which a plurality of battery cells including electrode leads are stacked; a plurality of bus bars including a first bus bar and a second bus bar that are respectively connected to at least one of the electrode leads; and a safety member that comes into contact with each of the first bus bar and the second bus bar, wherein the safety member includes a first insulating layer located on the first bus bar, a second insulating layer located on the second bus bar, and a conductive layer located on the first insulating layer and the second insulating layer, and wherein the first insulating layer and the second insulating layer include a material that is electrically insulating and is removed in accordance with the rise of temperature.

14 Claims, 9 Drawing Sheets

(51) Int. Cl.
  *H01M 50/503* (2021.01)
  *H01M 50/588* (2021.01)
  *H01M 50/593* (2021.01)

(52) U.S. Cl.
  CPC ....... *H01M 50/588* (2021.01); *H01M 50/593* (2021.01); *H01M 2200/10* (2013.01)

(58) Field of Classification Search
  CPC ............. H01M 50/581; H01M 50/588; H01M 50/593; Y02E 60/10; Y02T 10/62
  See application file for complete search history.

(56) References Cited

U.S. PATENT DOCUMENTS

| | | |
|---|---|---|
| 2013/0136974 A1 | 5/2013 | Lim et al. |
| 2014/0139185 A1 | 5/2014 | Han et al. |
| 2014/0170450 A1 | 6/2014 | Takahashi et al. |
| 2017/0125752 A1* | 5/2017 | Kim ................... H01M 50/287 |
| 2019/0245186 A1 | 8/2019 | Hong et al. |
| 2019/0366875 A1 | 12/2019 | Hong et al. |
| 2020/0127338 A1 | 4/2020 | Choi et al. |
| 2021/0050582 A1 | 2/2021 | Yoshida et al. |

FOREIGN PATENT DOCUMENTS

| | | | |
|---|---|---|---|
| JP | 5003117 B2 | | 8/2012 |
| JP | 5123624 B2 | | 1/2013 |
| JP | 2014-22284 A | | 2/2014 |
| JP | 2016-126880 A | | 7/2016 |
| JP | 2019050109 A | * | 3/2019 |
| JP | 2019-530186 A | | 10/2019 |
| KR | 10-2010-0060980 A | | 6/2010 |
| KR | 10-2013-0060420 A | | 6/2013 |
| KR | 10-2014-0064487 A | | 5/2014 |
| KR | 10-2016-0068722 A | | 6/2016 |
| KR | 10-2018-0018050 A | | 2/2018 |
| KR | 10-2018-0138028 A | | 12/2018 |
| KR | 10-2019-0005403 A | | 1/2019 |
| KR | 10-2019-0005404 A | | 1/2019 |
| WO | WO 2013/137451 A1 | | 9/2013 |
| WO | WO 2019/150704 A1 | | 8/2019 |

OTHER PUBLICATIONS

Machine translation JP2019050109A (Year: 2019).*
International Search Report for PCT/KR2020/009539 mailed on Oct. 29, 2020.
Extended European Search Report for European Application No. 20894256.5, dated Nov. 4, 2022.

* cited by examiner

[FIG. 1]
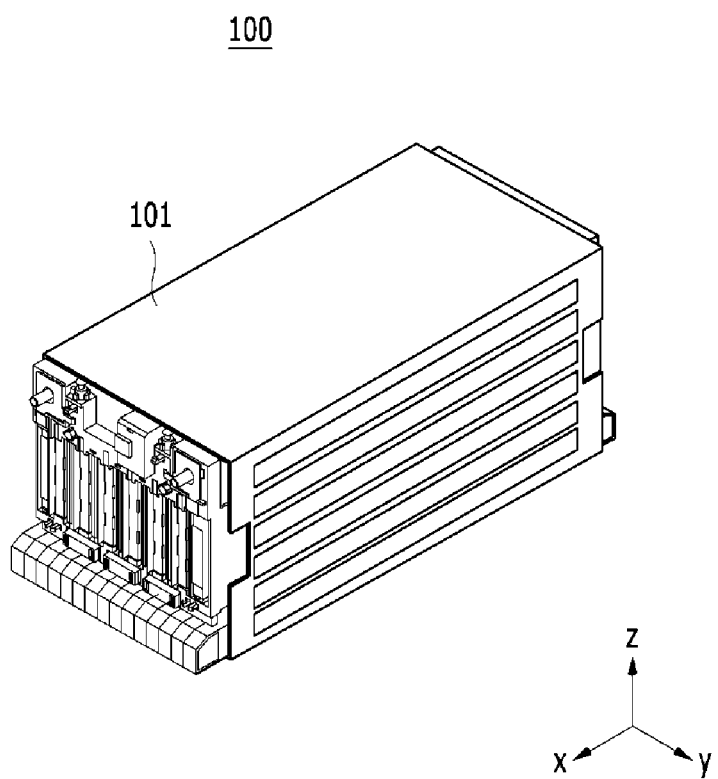

[FIG. 2]
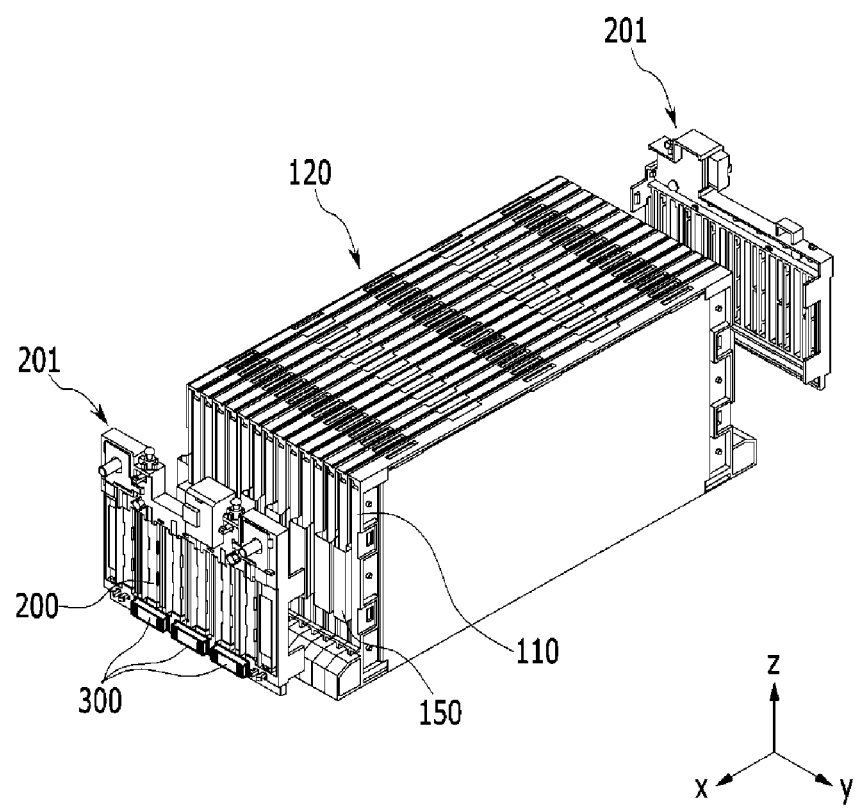

[FIG. 3]
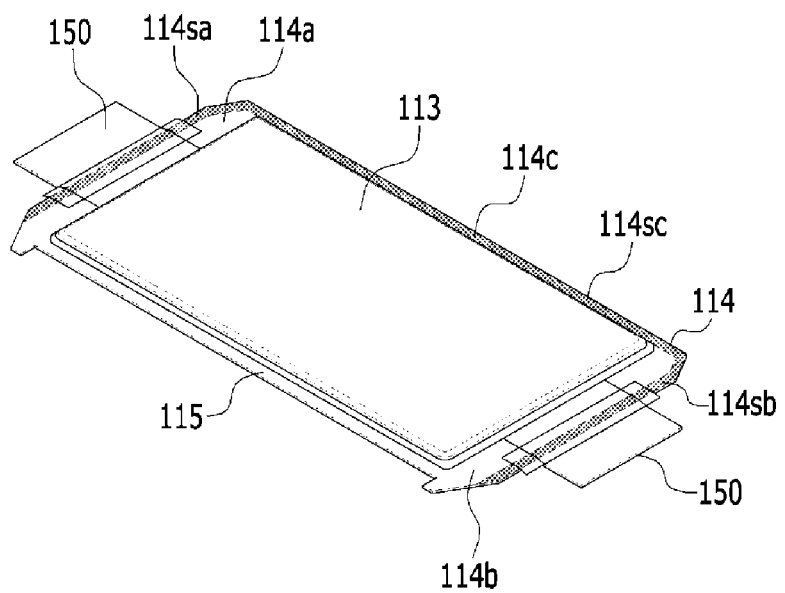

【FIG. 4】
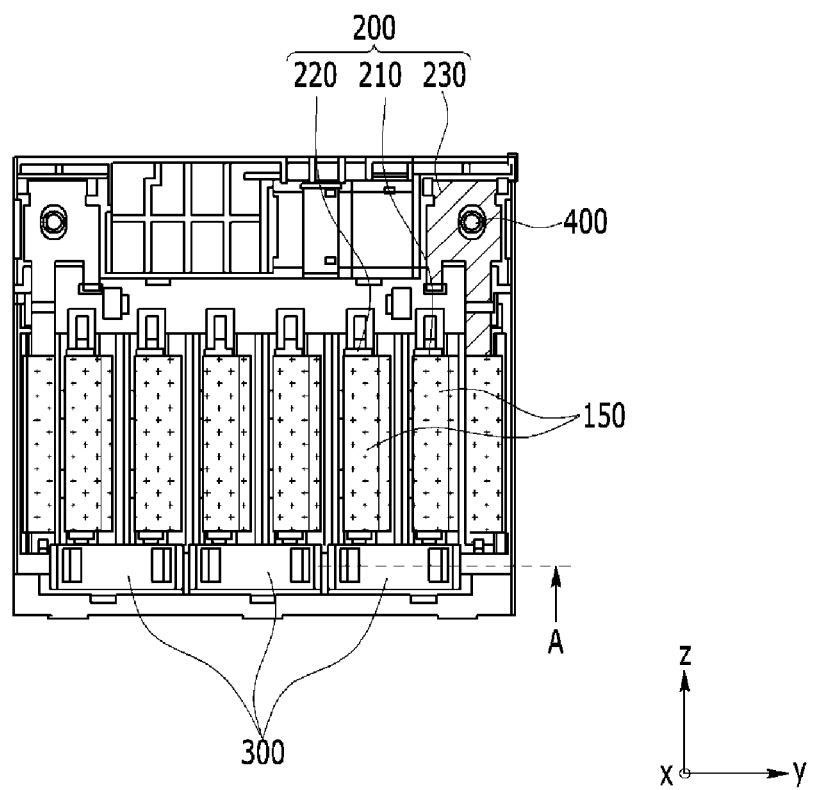

[FIG. 5]
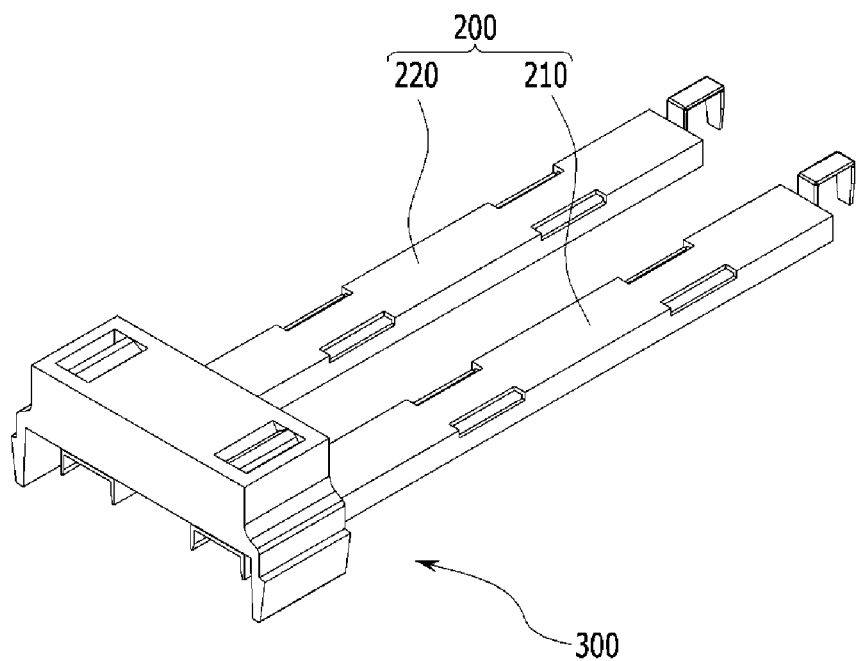

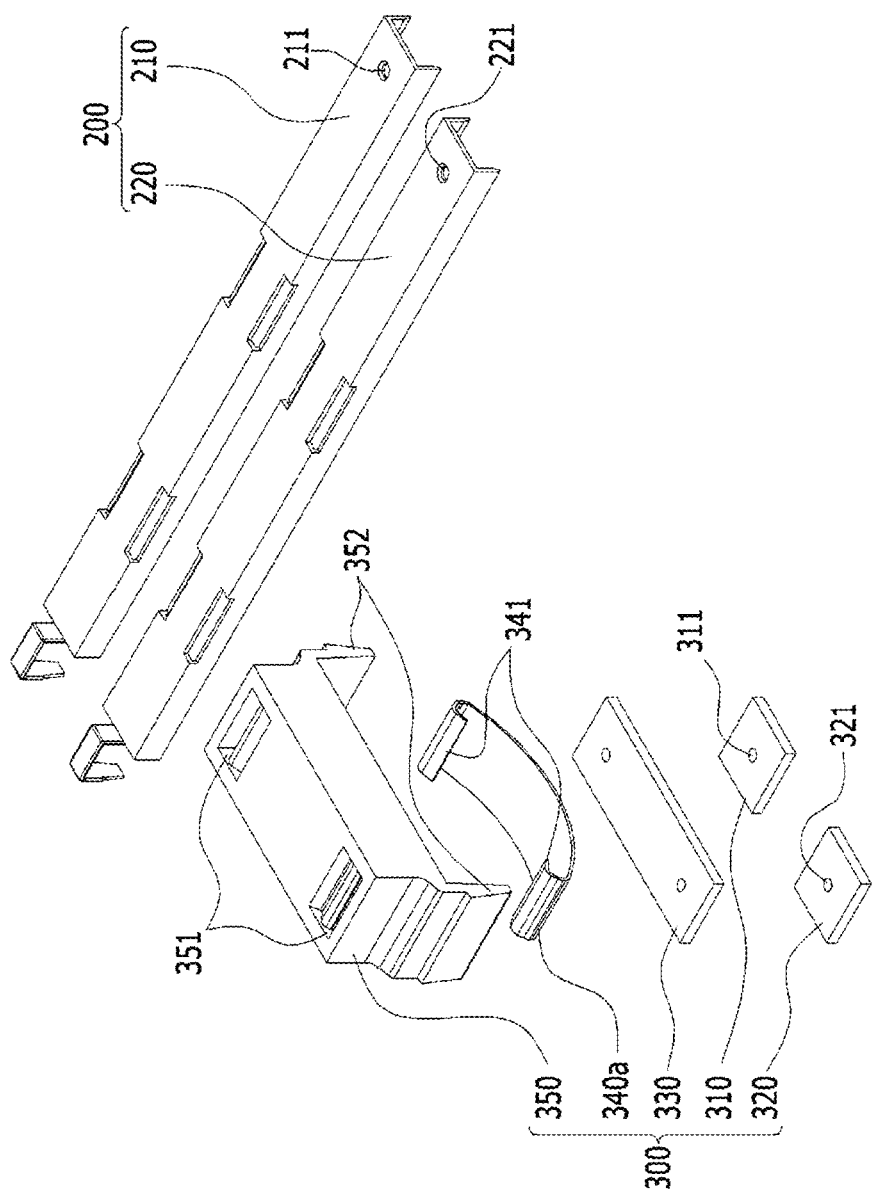
[FIG. 6]

[FIG. 7]
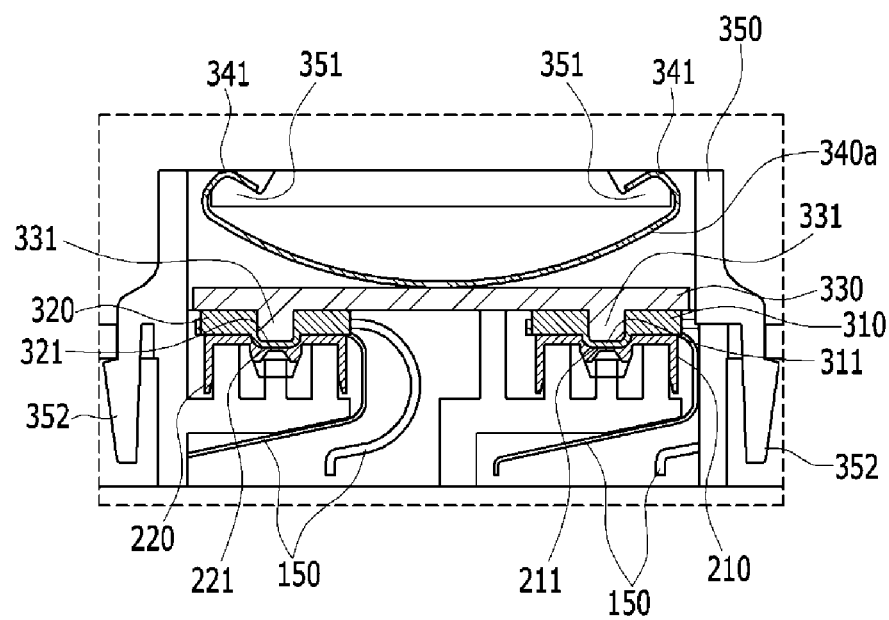

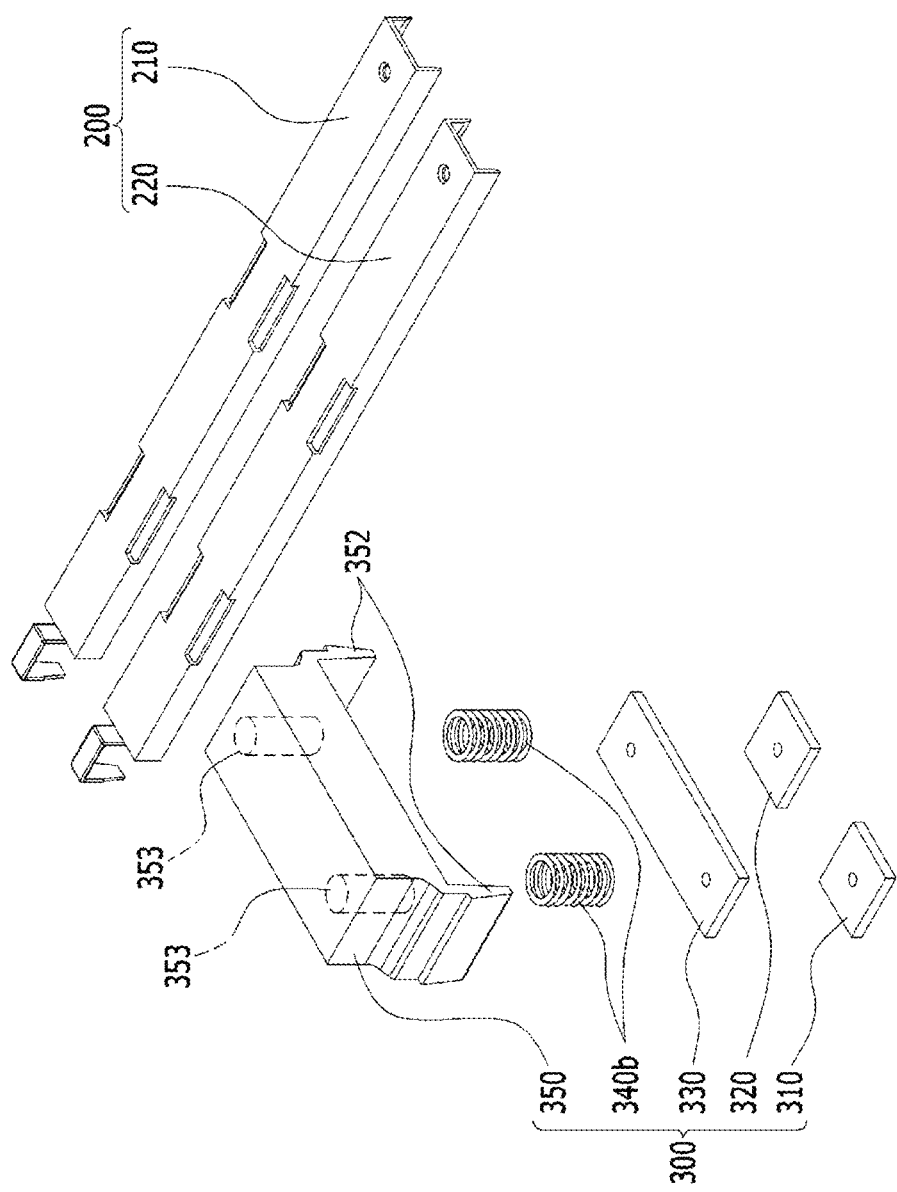
[FIG. 8]

[FIG. 9]
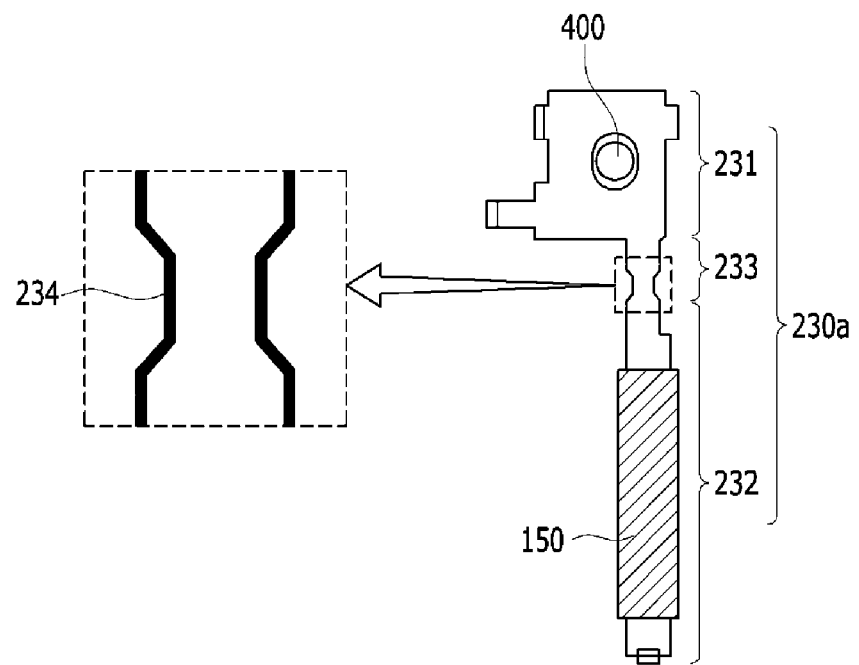

BATTERY MODULE AND BATTERY PACK INCLUDING THE SAME

CROSS CITATION WITH RELATED APPLICATION(S)

This application claims the benefit of Korean Patent Application No. 10-2019-0153520 filed on Nov. 26, 2019 with the Korean Intellectual Property Office, the disclosure of which is incorporated herein by reference in its entirety.

TECHNICAL FIELD

The present disclosure relates to a battery module and a battery pack including the same, and more particularly to a battery module with improved safety against external short circuit, and a battery pack including the same.

BACKGROUND ART

Secondary batteries, which are easily applicable to various product groups and has electrical characteristics such as high energy density, are universally applied not only for a portable device but also for an electric vehicle or a hybrid electric vehicle, an energy storage system or the like, which is driven by an electric driving source. Such secondary battery is attracting attention as a new environment-friendly energy source for improving energy efficiency since it gives a primary advantage of remarkably reducing the use of fossil fuels and also does not generate by-products from the use of energy at all.

Currently commercialized secondary batteries include a nickel cadmium battery, a nickel hydrogen battery, a nickel zinc battery, a lithium secondary battery, and the like. Among them, the lithium secondary battery has come into the spotlight because they have advantages, for example, hardly exhibiting memory effects compared to nickel-based secondary batteries and thus being freely charged and discharged, and having very low self-discharge rate and high energy density.

Such lithium secondary battery mainly uses a lithium-based oxide and a carbonaceous material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator being interposed between them, and an exterior material, i.e., battery case, which seals and houses the electrode assembly together with an electrolyte solution.

Generally, the lithium secondary battery may be classified based on the shape of the exterior material into a prismatic-type secondary battery in which the electrode assembly is mounted in a metal can, and a pouch-type secondary battery in which the electrode assembly is mounted in a pouch of an aluminum laminate sheet.

Small-sized mobile devices use one to three battery cells for each device, whereas middle or large-sized devices such as vehicles require high power and large capacity. Therefore, a middle or large-sized battery module having a plurality of battery cells electrically connected to one another is used.

The middle or large-sized battery module is preferably manufactured so as to have as small a size and weight as possible. Consequently, a prismatic type battery or a pouch-type battery, which can be stacked with high integration and has a small weight relative to capacity, is mainly used as a battery cell of the middle- or large-sized battery module.

In the case of a battery module to which such a plurality of battery cells are connected, if an excessive current is applied to the battery module due to an external short circuit, the battery module may explode or ignite. Therefore, effectively cutting off abnormal conditions such as external short circuits is essential for securing the safety of the battery module and the battery pack including the battery module.

For this purpose, conventionally, a bus bar formed with a notched structure is used or an additional fuse is disposed outside the battery module in an attempt to interrupt the current when an external short circuit situation occurs.

However, in the case of a bus bar formed with a notched structure, the current is effectively interrupted at a specific resistance that satisfies the external short circuit reference, but the interruption may not be performed outside a specific resistance.

When a fuse is disposed outside the battery module, a separate member is added inside the battery pack, which causes a problem that the spatial efficiency and utilization of the battery pack are deteriorated.

Therefore, there is a need for a technique that can solve the problems of the prior art.

DETAILED DESCRIPTION OF THE INVENTION

Technical Problem

Embodiments of the present disclosure have been designed to solve the above-mentioned problems of the existing proposed methods, and an object of the present disclosure is to provide a battery module with improved safety against external short circuits even when a separate member is not arranged outside the battery module.

However, the problem to be solved by embodiments of the present disclosure is not limited to the above-described problems, and can be variously expanded within the scope of the technical idea included in the present disclosure.

Technical Solution

A battery module according to one embodiment of the present disclosure includes: a battery cell stack in which a plurality of battery cells including electrode leads are stacked; a plurality of bus bars including a first bus bar and a second bus bar that are each respectively connected to at least one of the electrode leads; and a safety member that contacts each of the first bus bar and the second bus bar, wherein the safety member includes a first insulating layer located on the first bus bar, a second insulating layer located on the second bus bar, and a conductive layer located on the first insulating layer and the second insulating layer, and wherein the first insulating layer and the second insulating layer include a material that is electrically insulating and is removed in accordance with the rise of temperature.

The first insulating layer and the second insulating layer may include a material that is melted or vaporized in accordance with the rise of temperature.

The first insulating layer and the second insulating layer may include at least one of low-density polyethylene (LDPE) and linear low-density polyethylene (LLDPE).

The safety member may further include a spring located on the conductive layer, and the spring may push the conductive layer toward the first insulating layer and the second insulating layer are located.

The safety member may further include a cover that is opened on one side and houses the first insulating layer, the second insulating layer, the conductive layer, and the spring therein.

The spring may be located between the conductive layer and the cover.

The spring may include at least one of a plate spring and a coil spring.

Protrusions protruding toward the first insulating layer and the second insulating layer may be formed on the conductive layer, and a first recessed groove and a second recessed groove having a concave shape may be respectively formed on a first surface of the first insulating layer and the second insulating layer, so that the protrusions can be inserted.

The portions pushed out by the first recessed groove and the second recessed groove may be respectively formed on the opposite surfaces of the first insulating layer and the second insulating layer facing the first surface, and a first bus bar recessed groove and a second bus bar recessed groove having a concave shape may be respectively formed in the first bus bar and the second bus bar, so that the portions pushed out by the first recessed groove and the second recessed groove can be inserted.

A breakage induction portion having a narrower width or a thinner thickness compared to an adjacent region may be formed in at least one of the bus bars.

A notch recessed from outside to inside in the width direction of the bus bar may be formed in the breakage induction portion.

The bus bar may include a terminal bus bar, the terminal bus bar may include a first portion connected to an external input/output terminal and a second portion connected to an electrode lead of one of the plurality of battery cells, and the breakage induction portion may be formed on the terminal bus bar to connect the first portion and the second portion.

The first insulating layer and the second insulating layer may be removed when the temperature rises due to an external short circuit, and the first bus bar and the second bus bar may contact the conductive layer to cause a forced internal short circuit.

Advantageous Effects

According to the embodiments of the present disclosure, a safety member that induces an additional forced internal short when an external short occurs is provided on the bus bar, so that when an external short circuit occurs, the current can be effectively interrupted, thereby improving the safety of the battery module and the battery pack including the same.

BRIEF DESCRIPTION OF THE DRAWINGS

FIG. 1 is a schematic perspective view of a battery module according to one embodiment of the present disclosure.

FIG. 2 is an exploded perspective view of the battery module of FIG. 1 in which the module case is removed.

FIG. 3 is a perspective view of a battery cell included in the battery module of FIG. 2.

FIG. 4 is a front view of the battery module of FIG. 2 as viewed from a direction opposite to the x-axis.

FIG. 5 is a perspective view of the first bus bar, the second bus bar, and the safety member included in the battery module of FIG. 4.

FIG. 6 is an exploded perspective view of the first bus bar, the second bus bar, and the safety member of FIG. 5.

FIG. 7 is a cross-sectional view taken along the cutting line "A" of FIG. 4.

FIG. 8 is an exploded perspective view of a safety member including a coil spring.

FIG. 9 is a diagram of a terminal bus bar in which a breakage induction portion is formed.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that it can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 1 is a schematic perspective view of a battery module according to one embodiment of the present disclosure, and FIG. 2 is an exploded perspective view of the battery module of FIG. 1 in which the module case is removed.

Referring to FIGS. 1 and 3, a battery module 100 according to the present disclosure includes a battery cell stack 120 in which a plurality of battery cells 110 including electrode leads 150 are stacked, a plurality of bus bars 200 that are respectively connected to at least one of the electrode leads 150; and a safety member 300 that comes into contact with each of a first bus bar and a second bus bar among a plurality of the bus bars 200.

FIG. 3 is a perspective view of a battery cell 110 included in the battery module 100 of FIG. 2.

Referring to FIG. 3, the battery cell 110 is preferably a pouch-type battery cell. For example, the battery cell 110 according to the present embodiment has a structure in which two electrode leads 150 face each other and protrude from one end part 114a and the other one end part 114b of the battery body 113, respectively. More specifically, the electrode lead 150 is connected to an electrode assembly (not shown) and protruded toward the outside of the battery cell 110 from the electrode assembly (not shown).

Meanwhile, the battery cell 110 can be manufactured by joining both end portions 114a and 114b of a battery case 114 and a side portion 114c connecting them, in a state in which the electrode assembly (not shown) is housed in the battery case 114. That is, the battery cell 110 according to the present embodiment has a total of three sealing portions 114sa, 114sb and 114sc, the sealing portions 114sa, 114sb and 114sc have a structure that is sealed by a method such as thermal fusion, and the other one side portion may be formed of the connecting portion 115.

Referring back to FIG. 2, the battery cells 110 of FIG. 3 may be stacked along the y-axis direction to form a battery cell stack 120. Thereby, the electrode leads 150 of each of the plurality of battery cells 110 are protruded toward an x-axis direction and a direction opposite to the x-axis.

The electrode leads 150 are connected to each other via the bus bar 200, so that the battery cells 110 constituting the battery cell stack 120 may be connected in series or in parallel with each other.

The bus bar 200 can be mounted on the bus bar frame 201, and the bus bar frame 201 can be located in the x-axis direction and a direction opposite to the x-axis along the protruding direction of the electrode lead 150 of the battery cell stack 120.

The electrode lead 150 may be bent after passing through a slit formed in the bus bar frame 201, and connected to the bus bar 200, and the connection between the electrode lead 150 and the bus bar 200 is not particularly limited in the method as long as they are physically and electrically connected, but it is preferable that they are joined to each other by welding.

FIG. 4 is a front view of the battery module of FIG. 2 as viewed from a direction opposite to the x-axis.

Referring to FIG. 4, the plurality of bus bars 200 includes a first bus bar 210 and a second bus bar 220, and the safety member 300 comes into contact with each of the first bus bar 210 and the second bus bar 220.

For example, the first bus bar 210 and the second bus bar 220 may be adjacent to each other, and the safety member 300 may come into contact with each of the first bus bar 210 and the second bus bar 220 that are adjacent to each other in this way.

The number of the safety member 300 is not limited, and a plurality of the safety members may be disposed as shown in FIG. 4, if necessary.

Further, the portion excluding the portion where the first bus bar 210 and the second bus bar 220 are connected to the electrode lead 150 may come into contact with the safety member 300. For example, the first bus bar 210 and the second bus bar 220 may be connected to the electrode lead 150 at the central part, and the safety member 300 can come into contact at the lower end portion.

FIG. 5 is a perspective view of the first bus bar 210, the second bus bar 220, and the safety member 300 included in the battery module 100 of FIG. 4, and FIG. 6 is an exploded perspective view of the first bus bar 210, the second bus bar 220, and the safety member 300 of FIG. 5.

Referring to FIGS. 5 and 6, the safety member 300 includes a first insulating layer 310 located on the first bus bar 210, a second insulating layer 320 located on the second bus bar 220, and a conductive layer 330 located on the first insulating layer 310 and the second insulating layer 320.

The first insulating layer 310 and the second insulating layer 320 may include a material that is electrically insulating and is removed in accordance with the rise of temperature, and more specifically, may include a material that is melted or vaporized in accordance with the rise of temperature.

In particular, the first insulating layer 310 and the second insulating layer 320 may include at least one of low-density polyethylene (LDPE) and linear low-density polyethylene (LLDPE) having a melting point of 100° C. or higher.

The conductive layer 330 is a member that comes into contact with both the first insulating layer 310 and the second insulating layer 320, and includes a material that is electrically energized. For example, it may include at least one of Cu and Ag.

Meanwhile, the safety member 300 may further include a spring located on the conductive layer 300, and specifically, may include at least one of a plate spring and a coil spring. The spring may push the conductive layer 300 in a direction in which the first insulating layer 310 and the second insulating layer 320 are located.

The plate spring 340a will be described in detail later with reference to FIGS. 6 and 7, and the coil spring 340b will be described in detail later with reference to FIG. 8.

Meanwhile, the safety member 300 may include a cover 350 that is opened on one side and houses the first insulating layer 310, the second insulating layer 320, the conductive layer 330, and the plate spring 340a therein. For example, the cover 350 may have a hexahedral shape that is opened at its lower side, and a first insulating layer 310, a second insulating layer 320, a conductive layer 330, and a plate spring 340a may be located in an inner space interlocked with the opened lower side.

The cover 350 can play a role of protecting the first insulating layer 310, the second insulating layer 320, the conductive layer 330, and the plate spring 340a from the outside.

FIG. 7 is a cross-sectional view taken along the cutting line "A" of FIG. 4.

Referring to FIG. 7 together with FIG. 6, since the first insulating layer 310 and the second insulating layer 320 include a material that is electrically insulating, it is usually impossible to make an electrical connection through the conductive layer 330.

When an external short occurs and an overcurrent is applied to the battery module, the temperature rises. When the temperature rises above a certain level, the first insulating layer 310 and the second insulating layer 320 are removed by melting or vaporization, and the first bus bar 210 and the second bus bar 220 come into contact with the conductive layer 330.

Thereby, the first bus bar 210 and the second bus bar 220a form a new current path through the conductive layer 330, and a short circuit occurs in the battery cells connected to each of the first bus bar 210 and the second bus bar 220.

That is, by inducing a forced internal short circuit in the battery cells, a very high current flows instantaneously, and the temperature can further rise. Eventually, the electrode lead of the battery cell is cut, and the current is interrupted in this way, so that the risk of ignition or explosion due to an external short circuit can be interrupted in advance.

At this time, the plate spring 340a located between the conductive layer 330 and the cover 350 can push the conductive layer 330 in the direction in which the first insulating layer 310 and the second insulating layer 320 are located. As a result, when the first insulating layer 310 and the second insulating layer 320 are removed due to an external short circuit, the conductive layer 330 can easily contact the first bus bar 210 and the second bus bar 220 by the plate spring 340a, so that the forced internal short circuit described above can be easily induced.

A curved portion 341 may be formed at both end parts of the plate spring 340a, and a fastening portion 351 to which the curved portion 341 may be fastened may be formed on one surface of the cover 350. The plate spring 340a is fixed in the cover 350 while the curved portion 341 is fastened to the fastening portion 351, and the central portion of the plate spring 340a may push the conductive layer 330.

Meanwhile, the cover 350 may include a fixing portion 352 that is located at both end parts of the open lower surface and is protruded downward. The cover 350 may be fixed by being fitted to the bus bar frame 201 of FIG. 2 via a fixing portion 352 protruding downward in a state in which the first insulating layer 310, the second insulating layer 320, the conductive layer 330, and the plate spring 340a are housed in the inner space thereof.

Meanwhile, protrusion parts 331 protruded toward the first insulating layer 310 and the second insulating layer 320 may be respectively formed on the conductive layer 330.

A first recessed groove 311 and a second recessed groove 321 having a concave shape can be respectively formed on one surface of the first insulating layer 310 and the second insulating layer 320, so that the protrusion part 331 can be inserted. Further, the portions pushed out by the first recessed groove 311 and the second recessed groove 321 are respectively formed on the other surfaces of the first insulating layer 310 and the second insulating layer 320 facing the one surface.

A first bus bar recessed groove 211 and a second bus bar recessed groove 221 having a concave shape may be respectively formed in the first bus bar 210 and the second bus bar 220, so that the portion pushed out by the first recessed groove 311 and the second recessed groove 321 can be inserted.

That is, the protrusion parts 331 are inserted into the first recessed groove 311 and the second recessed groove 321, respectively, and the portions pushed out by the first recessed groove 311 and the second recessed groove 321 are inserted into the first bus bar recessed groove 211 and the second bus bar recessed groove 221, respectively. Through this, the conductive layer 330, the first and second insulating layers 310 and 320, and the first and second bus bars 210 and 220 may have improved contact performance and assembling performance for each layer.

FIG. 8 is an exploded perspective view of a safety member 300 including a coil spring 340b, which is a modified embodiment of the present disclosure.

Referring to FIG. 8, the safety member 300 may include a plurality of coil springs 340b instead of a plate spring, and a protrusion part 353 may be formed on an inner surface of the cover 350 facing the open lower surface so that the coil spring 340b can be inserted and fixed.

The protrusion part 353 can have a structure that is integrated with the cover 350 and protruded downward from the inner surface of the cover 350, and may have a cylindrical shape so that the coil spring 340b is fitted and fixed.

The coil spring 340b is located between the conductive layer 330 and the cover 350, similarly to the plate spring 340a described above, and can push the conductive layer 330 in the direction in which the first insulating layer 310 and the second insulating layer 320 are located. The details will be omitted since they overlap with the contents described in the plate spring 340a.

Referring back to FIG. 4, the plurality of bus bars 200 in the present disclosure may include a terminal bus bar 230 for electrically connecting with an external input/output terminal 400.

Specifically, the terminal bus bar 230 may be connected to the electrode lead of the battery cell located at the outermost side of the battery cell stack, and the terminal bus bar 230 may be connected to the external input/output terminal 400, unlike other bus bars.

FIG. 9 is a diagram of a terminal bus bar 230a in which a breakage induction portion 233 is formed.

Referring to FIG. 9, the terminal bus bar 230a in which the breakage induction portion 233 is formed has a structure applicable to the terminal bus bar 230 of FIG. 4, which is a modified embodiment of the present disclosure.

The terminal bus bar 230a may include a first portion 231 connected to the external input/output terminal 400, a second portion 232 connected to the electrode lead 150, and a breakage induction portion 233 connecting the first portion 231 and the second portion 232.

The breakage induction portion 233 refers to a portion having a narrower width or thinner thickness compared to an adjacent region, and FIG. 9 shows a breakage induction portion 233 having a narrow width as a representative example. In more detail, a notch 234 recessed from the outside to the inside in the width direction of the terminal bus bar 230a may be formed in the breakage induction portion 233.

The breakage induction portion 233 in FIG. 9 has a shape in which trapezoidal notches 234 are formed on both sides, but the notches may have various shapes such as V-shape, square, and semicircle if they are a recessed structure, and a notch can be formed only on one side.

Further, since the shape of the breakage induction portion is not limited if a portion having a narrow width or a thin thickness is formed, it may have a structure in which a through opening hole is formed instead of the notch.

On the other hand, the breakage induction portion 233 is not limited in its position and thus, may be formed in the other bus bars in addition to the terminal bus bar 230a, but as shown in FIG. 9, it is preferable to be located in the terminal bus bar 230a, in particular, between the first portion 231 and the second portion 232.

According to embodiments of the present disclosure, when an external short circuit occurs, the safety member 300 induces a forced internal short circuit to cause disconnection of an electrode lead or the like, thereby improving the safety against an external short circuit.

At this time, since the breakage induction portion 233 according to the present embodiment has a narrower width or thinner thickness compared to an adjacent region, when an overcurrent flows, the temperature may rise to induce breakage. Therefore, if the temperature rises due to a forced internal short circuit, the breakage induction portion 233 is broken to interrupt the current flowing through the battery module and prevent the occurrence of a safety accident.

In other words, by providing a bus bar in which the breakage induction portion 233 is formed together with the safety member 300 for inducing a forced internal short circuit, the embodiments of the present disclosure can more effectively interrupt the current when an external short circuit occurs.

One or more battery modules according to the present embodiment described above can be mounted together with various control and protection systems such as a battery management system (BMS) and a cooling system to form a battery pack.

The battery module or the battery pack can be applied to various devices. These devices may be applied to transportation means such as an electric bicycle, an electric vehicle, a hybrid vehicle, but the present disclosure is not limited thereto and can be applied to various devices that can use the secondary battery.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module
110: battery cell
120: battery cell stack
150: electrode lead
210: first bus bar
220: second bus bar
230, 230a: terminal bus bar
300: safety member

The invention claimed is:

1. A battery module comprising:
a battery cell stack in which a plurality of battery cells including electrode leads are stacked;
a plurality of bus bars including a first bus bar and a second bus bar that are each respectively connected to at least one of the electrode leads; and
a safety member that contacts each of the first bus bar and the second bus bar,
wherein the safety member includes a first insulating layer located on the first bus bar, a second insulating layer located on the second bus bar, and a conductive layer located on the first insulating layer and the second insulating layer, and
wherein the first insulating layer and the second insulating layer include a material that is electrically insulating and is removed in accordance with a rise of temperature.

2. The battery module according to claim 1, wherein the first insulating layer and the second insulating layer include a material that is melted or vaporized in accordance with the rise of temperature.

3. The battery module according to claim 1, wherein the first insulating layer and the second insulating layer include low-density polyethylene (LDPE) or linear low-density polyethylene (LLDPE).

4. The battery module according to claim 1, wherein the safety member further includes a spring located on the conductive layer, and
wherein the spring pushes the conductive layer toward the first insulating layer and the second insulating layer.

5. The battery module according to claim 4, wherein the safety member further includes a cover that is opened on one side and houses the first insulating layer, the second insulating layer, the conductive layer, and the spring therein.

6. The battery module according to claim 5, wherein the spring is located between the conductive layer and the cover.

7. The battery module according to claim 4, wherein the spring a plate spring or a coil spring.

8. The battery module according to claim 1, wherein protrusions protruding toward the first insulating layer and the second insulating layer are formed on the conductive layer, and
a first recessed groove and a second recessed groove having a concave shape are respectively formed on a first surface of the first insulating layer and the second insulating layer, so that the protrusions can be inserted.

9. The battery module according to claim 8, wherein portions pushed out by the first recessed groove and the second recessed groove are respectively formed on the opposite surfaces of the first insulating layer and the second insulating layer facing the first surface, and
wherein a first bus bar recessed groove and a second bus bar recessed groove having a concave shape are respectively formed in the first bus bar and the second bus bar, so that the portions pushed out by the first recessed groove and the second recessed groove can be inserted.

10. The battery module according to claim 1, wherein a breakage induction portion having a narrower width or a thinner thickness compared to an adjacent region is formed in at least one of the plurality of bus bars.

11. The battery module according to claim 10, wherein a notch recessed in a width direction of an edge of the bus bar is formed in the breakage induction portion.

12. The battery module according to claim 10, wherein the bus bar includes a terminal bus bar,
wherein the terminal bus bar includes a first portion connected to an external input/output terminal and a second portion connected to an electrode lead of one of the plurality of battery cells, and
wherein the breakage induction portion is formed on the terminal bus bar to connect the first portion and the second portion.

13. The battery module according to claim 1, wherein the first insulating layer and the second insulating layer are removed when the temperature rises due to an external short circuit, and
wherein the first bus bar and the second bus bar contact the conductive layer to cause a forced internal short circuit.

14. A battery pack comprising one or more battery modules as set forth in claim 1.

* * * * *